United States Patent Office 3,814,800
Patented June 4, 1974

3,814,800
ANTIBACTERIAL COMPOSITION
Edmund Stanley Granatek, Baldwinsville, Murray Arthur Kaplan, Syracuse, and Alphonse Peter Granatek, Baldwinsville, N.Y., assignors to Bristol-Myers Company, New York, N.Y.
No Drawing. Filed Feb. 16, 1970, Ser. No. 11,782
Int. Cl. A61k 21/00
U.S. Cl. 424—271     11 Claims

ABSTRACT OF THE DISCLOSURE

Antibacterial compositions comprising a water soluble salt of ampicillin or hetacillin or a mixture thereof, water and acetone have improved stability and are particularly useful for parenteral administration for the treatment of bacterial infections in animals.

BACKGROUND OF THE INVENTION

This invention relates to a novel antibacterial composition having improved stability useful for treating bacterial infections due to Gram-negative and Gram-positive bacteria in animals including man. The compositions of this invention are particularly useful for parenteral administration. In another aspect this invention relates to a method of improving the biological stability of an antibacterial composition.

Both ampicillin and hetacillin have proved highly effective in therapy of infections due to Gram-positive and Gram-negative bacteria. Ampicillin and hetacillin as the free acids are administered either orally in the form of capsules, tablets or aqueous suspensions or intramuscularly in the form of an aqueous suspension. These antibacterial agents are not useful for intravenous administration because of their relatively low solubility in water.

It has been found that various salts including alkali metal salts, e.g., sodium and potassium salts of ampicillin and hetacillin are more soluble than the free acid in water and are suitable for intravenous administration in the form of an aqueous solution.

Unfortunately the biological activities of ampicillin and hetacillin salts in aqueous solution deteriorates rapidly. With respect to sodium ampicillin the Official Package Circular provides that the solution must be used within one hour after reconstitution. Hetacillin salts in aqueous solution are somewhat more stable than ampicillin salts e.g., potassium hetacillin is biologically stable (within 10% of the original biological activity) for about six hours. It would be a substantial advantage to the physician if reconstituted solutions of ampicillin and hetacillin salts were stable for longer periods of time.

It is an object of the present invention to provide aqueous antibacterial compositions useful for parenteral administration.

It is another object of the present invention to provide aqueous antibacterial compositions containing water soluble salts of ampicillin and hetacillin having improved biological stability.

The objects of the present invention have been achieved by the provision of an antibacterial composition comprising a water soluble salt of a member selected from the group consisting of ampicillin and hetacillin, about 1 to about 10 moles of acetone per mole of said salt and water.

Ampicillin is the generic name for D-(—)-α-aminobenzylpenicillin and has been marketed commerically in the United States and various foreign countries for several years. The preparation of ampicillin and its salts and properties thereof have been described, inter alia, in U.S. Pats. 2,985,648, 3,140,282, 3,144,445, 3,157,640 and 3,180,862.

Hetacillin is the generic name for 6-(2,2-dimethyl-5-oxo-4-phenyl-1-imidazolidinyl)penicillanic acid which has the structure

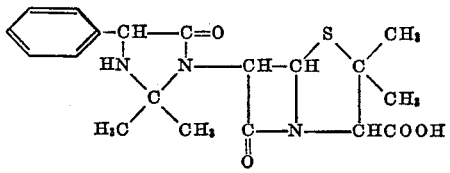

and has been marketed commercially in various countries for several years. The preparation of hetacillin and its salts and the properties thereof have been described in U.S. Pat. 3,198,804.

The term water soluble salts includes the water soluble pharmaceutically acceptable nontoxic salts, for example, nontoxic cationic salts of the acidic carboxylic acid group and the nontoxic pharmaceutically acceptable acid addition anionic salts (i.e., salts of the basic nitrogen). In the preferred embodiment of the present invention the water soluble salt is an alkali metal salt, such as the sodium or potassium salt.

The antibacterial compositions of the present invention are aqueous solutions of a water soluble salt of ampicillin or hetacillin containing acetone. Acetone is present in the compositions in an amount of from about 1 to about 10 moles of acetone per mole of ampicillin or hetacillin salt and preferably 1 to about 4 moles acetone per mole of ampicillin or hetacillin salt.

The compositions of this invention are suitable for intramuscular or intravenous administration. The compositions have substantially greater biological stability than the corresponding compositions without acetone. Thus these compositions have a longer useful life than the solutions without acetone.

In a preferred embodiment of the present invention the composition contains from about 100 to about 550 mg. of ampicillin or hetacillin salt per ml. of solution. When sodium ampicillin is employed in the composition the solution has a life of about two days after reconstitution and when potassium hetacillin is employed the solution has a life of at least about one day after reconstitution, when stored at room temperature. When stored at 0° C. the solutions have substantially longer lives e.g. sodium ampicillin has a life or over seven days after reconstitution.

The compositions of this invention are prepared by simply mixing the desired salt of ampicillin or hetacillin with acetone and water. Usually the salt of ampicillin or hetacillin is added to a solution of acetone and water. Water is present in the compositions of this invention in an amount sufficient to dissolve the salt.

A particular embodiment of the present invention is a therapeutic composition in unit dosage form comprising from about 100 to about 550 mg. per unit dose of a member selected from the group consisting of ampicillin or hetacillin in the form of a water-soluble salt. Usually the unit dose is one milliliter of said composition.

In another aspect this invention relates to a method of stabilizing aqueous solutions of a water soluble salt of ampicillin or hetacillin by the addition of from 1 to about 10 moles of acetone per mole of salt and preferably from about 1 to about 4 moles of acetone per mole of penicillin.

In the actual formulations use is often made as is customary in this field of an overfill, e.g., of ten percent, of each active ingredient as compared to labelled potency.

The following examples are intended to illustrate the invention described herein without unduly restricting it.

EXAMPLE 1

(1) Preparation of Solution A (with acetone)

Sodium ampicillin (2.6 g.) was dissolved in an acetone-water solution containing 1.4 ml. acetone and 6.6 ml. deionized water. This solution contained the equivalent of 250 mg. ampicillin activity per 1 milliliter.

(2) Preparation of Solution B (with acetone)

Sodium ampicillin (1.3 g.) was dissolved in an acetone-water solution containing 0.7 mls. acetone and 8.3 ml. deionized water. This solution contained the equivalent of 125 mg. ampicillin activity per milliliter.

(3) Stability Test

Samples of Solution A and Solution B were stored at room temperature and 0° C. Samples were assayed for biological activity by the turbidimetric method at 0, 1, 2, 3 and 7 days. The following table contains the results.

| | Solution A (Room temperature, 0° C.) | | | | Solution B (Room temperature, 0° C.) | | | |
|---|---|---|---|---|---|---|---|---|
| Days | Assay, mcg./ml. | Percent loss in activity | Assay | Percent loss in activity | Assay, mcg./ml. | Percent loss in activity | Assay | Percent loss in activity |
| 0 | 2,450 | | 2,450 | | 1,200 | | 1,200 | |
| 1 | 2,200 | 10.2 | 2,530 | +3.2 | 1,110 | 7.5 | >1,850 | |
| 2 | 2,130 | 13.0 | 2,566 | +4.5 | 1,060 | 11.6 | 1,200 | 0 |
| 3 | 1,766 | 27.9 | 2,450 | 0 | 843 | | 1,166 | 2.8 |
| 7 | | | 2,350 | 4.0 | | | 1,233 | +2.7 |

Solutions A and B were stable at room temperature for about two days (loss in activity up to 15% considered stable). At 0° C. both solutions were stable for over 7 days.

EXAMPLE 2

Preparation of Solution C (without acetone)

Sodium ampicillin (5.2 g.) was dissolved in 6.0 ml. of deionized water. Total volume of solution=10.0 ml. This solution contained the equivalent of 500 mg. ampicillin activity per milliliter.

Samples of the sodium ampicillin solution were stored at room temperature and assayed for biological activity at 0, 3, 6 and 24 hours. Samples were diluted 1/100 for bioassay. The following table contains the results.

| Hours | Assay, mcg./ml. | Percent loss |
|---|---|---|
| 0 | 5,250 | |
| 3 | 4,100 | 21.8 |
| 6 | 3,150 | 40.0 |
| 24 | <1,000 | >81.0 |

Conclusion: Solution C without acetone had over a 20% loss in activity after 3 hours at room temperature.

EXAMPLE 3

Preparation of Solution D (with acetone)

Sodium ampicillin (5.2 g., 0.14 moles) was dissolved in 6 ml. of an acetone-water solution containing 2.40 ml. (0.42 moles) acetone and 3.60 ml. deionized water.
Samples of this solution were stored at room temperature and assayed for biological activity at 0, 3, 6 and 24 hours. The loss in activity was as follows:

| | Percent |
|---|---|
| 3 hours | 2.1 |
| 6 hours | 4.2 |
| 24 hours | 3.7 |

EXAMPLE 4

Summary of results of Examples 2–3.

| | Percent loss in activity at— | | |
|---|---|---|---|
| Solution | 3 hrs. | 6 hrs. | 24 hrs. |
| C (Sodium ampicillin, 500 mg./ml.) | 22.0 | 40.0 | >81.0 |
| D (Sodium ampicillin, 500 mg./ml. plus 3 moles of acetone/mole sodium ampicillin) | 2.1 | 4.2 | 3.7 |

EXAMPLE 5

Solutions were prepared containing 5.2 g. sodium ampicillin and 5.2 ml. deionized water and 1.1 ml. acetone (Solution E) and 4.1 deionized water and 2.2 ml. acetone (Solution F) respectively. Storage at room temperature produced the following results:

| | Percent loss in activity | |
|---|---|---|
| Hours | Solution E | Solution F |
| 0 | | |
| 6 | 10 | 0 |
| 22 | 14 | 0 |
| 45 | 6 | 16 |
| 69 | 43 | 18 |
| 140 | 65 | 45 |

EXAMPLE 6

Solutions of potassium hetacillin with and without acetone having the equivalent of 500 mg. ampicillin activity/ml. of solution were prepared as follows:

Solution A:
    Potassium hetacillin _____ g__ 5.43
    Water _____ ml__ 6
Solution B:
    Potassium hetacillin _____ g__ 5.43
    Acetone _____ ml__ 0.934
    Water _____ ml__ 5.066
Solution C:
    Potassium hetacillin _____ g__ 5.43
    Acetone _____ ml__ 1.868
    Water _____ ml__ 4.132
Solution D:
    Potassium hetacillin _____ g__ 5.43
    Acetone _____ ml__ 2.8
    Water _____ ml__ 3.2

The solutions were stored at room temperature and the solutions were assayed for biological activity at various time intervals. The following are the results:

POTASSIUM HETACILLIN STABILITY IN WATER WITH AND WITHOUT ACETONE

[Theoretical: 500 mg. activity/ml. activity]

| Sample number* | Original (mg./ml.) | 24 hrs. (mg./ml.) | Percent loss | 48 hrs. (mg./ml.) | Percent loss | 72 hrs. (mg./ml.) | Percent loss |
|---|---|---|---|---|---|---|---|
| A | 440 | 320 | 27.3 | 300 | 31.8 | 250 | 43.2 |
| B | 455 | 385 | 15.4 | 340 | 25.3 | 290 | 36.3 |
| C | 450 | 410 | 8.9 | 395 | 12.2 | 395 | 12.2 |
| D | 460 | 440 | 4.3 | 440 | 4.3 | 430 | 6.5 |

*A=No acetone added. B=1 mole equivalent acetone added. C=2 moles equivalent acetone added. D=3 moles equivalent acetone added.

NOTE.—Percent loss calculated from original.

While the foregoing invention has been described and exemplified in terms of its preferred embodiment, those skilled in the art will appreciate that modifications can be made without departing from the spirit and scope of this invention.

We claim:

1. An antibacterial composition in solution form for parenteral administration comprising about 100 to about 550 mg. of a water-soluble salt of a member selected from the group consisting of ampicillin and hetacillin, about 2 to about 10 moles of acetone per mole of said ampicillin salt and about 1 to about 10 moles of acetone per mole of said hetacillin salt and water.

2. The antibacterial composition of claim 1 comprising about 2 to about 4 moles of acetone per mole of ampicillin salt and about 1 to about 4 moles of acetone per mole of hetacillin salt.

3. The antibacterial composition of claim 2 wherein said water-soluble salt is an alkali metal salt.

4. The antibacterial composition of claim 3 wherein said alkali metal salt is a sodium or potassium salt.

5. The antibacterial composition of claim 4 wherein said salt is a sodium or potassium salt of ampicillin.

6. The antibacterial composition of claim 4 wherein said salt is a sodium or potassium salt of hetacillin.

7. The antibacterial composition of claim 4 wherein said salt is sodium ampicillin.

8. The antibacterial composition of claim 4 wherein said salt is potassium ampicillin.

9. The antibacterial composition of claim 4 wherein said salt is sodium hetacillin.

10. The antibacterial composition of claim 4 wherein said salt is potassium hetacillin.

11. The antibacterial composition of claim 4 in unit dosage form.

References Cited

UNITED STATES PATENTS 3,317,389    5/1967    Grawatek et al. _____ 424—271

OTHER REFERENCES

Greenberg et al., Handbook of Cosmetic Materials, Interscience Publishers, Inc., 1954, N.Y., p. 22.

Husa, Pharmaceutical Dispensing, Mack Publishing Co., Easton, Pa., 1966, p. 619.

The Merck Index of Chemicals and Drugs, 7th edition, 1960, Merck & Co. Inc., Rahway, N.J., pp. 7 and 8.

STANLEY J. FRIEDMAN, Primary Examiner